Patented Dec. 29, 1925.

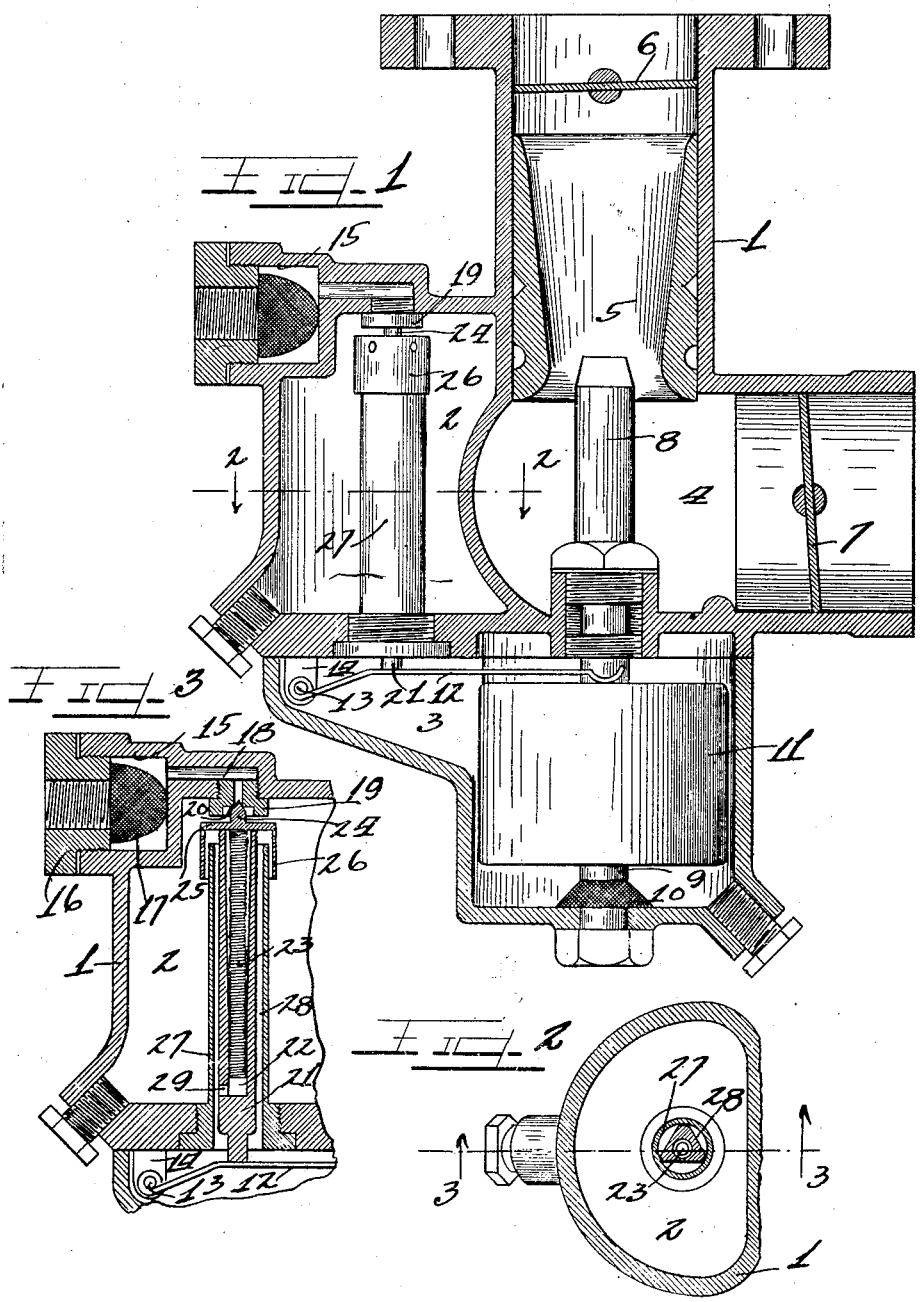

1,567,816

UNITED STATES PATENT OFFICE.

CHARLES L. RAYFIELD, OF CHICAGO, ILLINOIS, ASSIGNOR TO BENEKE MANUFACTURING COMPANY, OF CHICAGO, ILLINOIS, A CORPORATION OF ILLINOIS.

FLEXIBLE FUEL-SUPPLY VALVE FOR CARBURETORS.

Application filed April 29, 1920. Serial No. 377,514.

*To all whom it may concern:*

Be it known that I, CHARLES L. RAYFIELD, a citizen of the United States, and a resident of the city of Chicago, in the county of Cook and State of Illinois, have invented certain new and useful Improvements in a Flexible Fuel-Supply Valve for Carburetors; and I do hereby declare that the following is a full, clear, and exact description of the same, reference being had to the accompanying drawings, and to the numerals of reference marked thereon, which form a part of this specification.

This invention relates to a flexible fuel supply valve for carburetors, and more particularly to a flexible valve adapted to control the fuel supply in the float chamber of a carburetor. Valves of this type are ordinarily operatively connected to the float in the float chamber and act to regulate the level of fuel in said chamber. In rigid valves of this type as heretofore constructed difficulty has been experienced with leakage due to the fact that the vibration of the motor soon wears the needle portion of said rigid valve and allows liquid fuel to enter therearound. The weight of these rigid valves has also proven to be a disadvantage because of the inertia of the heavy valve causing rapid wearing of the valve and seat.

It is an object, therefore, of this invention to provide a flexible fuel supply valve for a carburetor which is unaffected by vibration.

It is also an object of this invention to provide a valve adapted to control the fuel supply in the float chamber of a carburetor, said valve having a flexible operative connection with the float in said chamber.

It is an important object of this invention to provide a light weight flexible valve for controlling the fuel supply in the float chamber of a carburetor.

It is also an important object of this invention to provide a valve having a flexible stem whereby said valve may operate to close an aperture out of alignment with the stem.

Other and further important objects of this invention will be apparent from the disclosures in the specification and the accompanying drawings.

The invention (in a preferred form) is shown in the drawings and hereinafter more fully described.

On the drawings:

Figure 1 is a central vertical section taken through a carburetor equipped with the flexible valve of this invention.

Figure 2 is a section on line 2—2 of Figure 1.

Figure 3 is a section on line 3—3 of Figure 2.

As shown on the drawings:

In Figure 1 the device of this invention is shown in position in the fuel chamber of a carburetor. Said carburetor is formed from a unitary chamber 1, which has formed therein the fuel inlet chamber 2, the float chamber 3, the air inlet chamber 4, and the Venturi mixing chamber 5. The flow of carbureted fuel from the mixing chamber 5 is controlled by the throttle valve 6, while the entrance of air into the air chamber 4 is controlled by a butterfly valve 7. For spraying fuel into the mixing chamber 5, an inlet nozzle is provided and said inlet nozzle is in communication with the float chamber 3 through a tube 9 and a screen 10, which surround the open lower portion of said tube 9. A float 11 is carried in the float chamber 3 and is engaged around and freely slidable on the tube 9. The valve-control lever 12 rests at all times on the top of said float 11 and is pivoted at 13 on the boss 14, which extends from the interior of the casing 1. An internally threaded, recessed boss 15 is formed in the casing 1 at the upper and outer portion of the chamber 2, and the centrally apertured threaded plug 16 is secured in said boss. Liquid fuel is introduced to the aperture in said plug 16 through the screen 17 into the recess in the boss 15, from said recess to the passage 18 in the casing 1, and through the passaged plug 19, in which the valve seat 20 is provided. A triangular member 21, in which a cylindrical outwardly flared recess 22 is provided, is engaged through an aperture in the casing 1 in the bottom of the chamber 2 and rests on the lever 12. A light coiled spring 23 is frictionally engaged and supported in the contracted portion of the flared recess 22 and the needle valve 24 is supported and secured on said spring and the member 21. A horizontal flange 25 is formed on the valve 24 and a cylindrical apertured shield 26 extends downwardly from the periphery of said flange. The sleeve 27, which is secured in the aperture in the bottom of the chamber 2, surrounds the triangular member 21 affording a passage 28 between said sleeve and said triangular member. Communication between the recess 22 in the member 21 and said passage 28 is afforded by sediment passage 29 formed in the member at the lower end of the recess.

The operation is as follows:

The guide member 21 rests constantly on the lever 12 and consequently is moved upwardly or downwardly by the float 11 as the level of liquid in the float chamber 3 changes. This upward and downward motion of the member 21 is transmitted to the valve 24, which is adapted to seat in the seat 20 and control the flow of liquid fuel which enters through the passage in the plug 18. When the float chamber 3 is filled with liquid fuel, float 11 of course forces the lever 12 and the member 21 upwardly causing the valve 24 to seat in the seat 20 and thus prevent further liquid fuel from entering. Likewise, when the level of fuel in the chamber 3 is lowered, the float 11 moves downwardly and allows the valve 24 to open and liquid fuel to enter the fuel chamber 2. Said entering fuel flows onwardly over the flange 25 and downwardly over the shield 26, entering the passage 28 over the top of the sleeve 27. The apertures in the shield 26 allow free passage of air therethrough and thus it is possible to keep the fuel chamber filled to the proper level. In many types of carburetors the shield 26 may be dispensed with. Flexible action of the needle due to the light coiled spring 23 allows said valve 24 to seat perfectly and cushions it from the vibration of the engine, on which the carburetor is attached. On account of the outwardly flaring recess 22, the upper end of the spring 23 and the valve 24 thereon are allowed to move laterally, thus adapting the valve to seat perfectly even though the seat is not properly aligned. By preventing vibration, the wearing out of the needle is eliminated in a large measure. The valve is very light in weight since it comprises only the portion 24 and the attached flange 25 and shield 26, and due to the light weight thereof the inertia is slight.

This invention provides a light-weight flexible shut-off valve for the fuel supply chamber of the carburetor. The use of this valve is not limited to the form of carburetor shown and described, but it is adapted to be used for controlling the flow of liquid in any carburetor or device where a light weight valve having a flexible stem is required.

I am aware that numerous details of construction may be varied through a wide range without departing from the principles of this invention, and I therefore do not purpose limiting the patent granted otherwise than necessitated by the prior art.

I claim as my invention:

1. A valve of the class described comprising a sleeve, a recessed member loosely mounted therein, a passage leading from the recess in the member to the interior of the sleeve, a coiled spring in the recess in the member, and a valve secured on the outer end of the spring.

2. A valve of the class described comprising a sleeve, a recessed member loosely mounted therein, flexible means in the recess in the member, and a valve secured to said flexible means at the outer end of the member.

3. A valve of the class described comprising a sleeve, a recessed member loosely mounted therein, a cushioning mechanism in the recess in the member, a valve secured to the cushioning mechanism, and a shield secured to the valve and loosely engaged over the end of the sleeve.

4. A valve of the class described comprising a sleeve, a spring-supported valve loosely mounted therein, and an apertured shield secured to the valve and loosely engaged over the end of the sleeve.

5. A valve of the class described comprising a sleeve, a recessed member loosely mounted therein, a passage leading from the recess in the member to the interior of the sleeve, a coiled spring in the recess in the member, a needle valve secured on the outer end of the spring, and a shield secured to the needle valve and loosely engaged over the end of the sleeve.

6. A valve comprising a member having a flared recess, a flexible cushioning mechanism in the recess therein, and a needle valve supported on said member and secured to the cushioning mechanism.

7. A device of the class described, comprising a valve, a flexible supporting mechanism therefor, and tubular means surrounding said supporting mechanism and frictionally supporting a part thereof.

8. A device of the class described comprising a member having an outwardly flared recess therein, a flexible member secured in the contracted portion of the recess and extending to the outer end of the first mentioned member, and a valve secured to the outer end of the flexible member.

9. In a device of the class described a flexible member, encasing means therefor, said encasing means securing a portion of the flexible member and allowing the remainder thereof to move freely laterally therein, and a valve secured to the freely movable portion of the flexible member outside of the encasing means.

In testimony whereof I have hereunto subscribed my name.

CHARLES L. RAYFIELD.